May 1, 1923.

G. A. CHEETHAM 1,453,441

EXCESS DEMAND METER

Filed Oct. 6, 1920

WITNESSES:

INVENTOR
George Arthur Cheetham
BY
ATTORNEY

Patented May 1, 1923.

1,453,441

UNITED STATES PATENT OFFICE.

GEORGE A. CHEETHAM, OF MANCHESTER, ENGLAND, ASSIGNOR TO WESTINGHOUSE ELECTRIC & MANUFACTURING COMPANY, A CORPORATION OF PENNSYLVANIA.

EXCESS-DEMAND METER.

Application filed October 6, 1920. Serial No. 415,093.

*To all whom it may concern:*

Be it known that I, GEORGE A. CHEETHAM, a subject of the King of Great Britain, and a resident of Manchester, in the county of Lancaster and Kingdom of Great Britain, have invented a new and useful Improvement in Excess-Demand Meters, of which the following is a specification.

My invention relates to electrical measuring instruments and, particularly, to excess-demand meters.

The object of my invention is to provide an excess-demand meter that shall have a retarding torque that is applied to the motor spindle by the action of a weight on one arm of a horizontally pivoted bell-crank lever, the other arm of which is operatively connected to the meter spindle.

Application, Serial No. 136,061, filed Dec. 9, 1916, by A. Muratori, patented September 17, 1921, No. 1,392,199 and assigned to the Westinghouse Electric & Manufacturing Company, discloses a meter having one arm of the bell-crank lever connected, through a flexible connection, to a pulley that is loosely mounted on the meter spindle which is driven and released by means of a ring mounted coaxially with the meter spindle and pivotally attached thereto. The ring is provided with pins projecting radially and adapted to engage a pin projecting from the pulley to rotate said pulley against the force of the pivoted weighted lever by reason of the torque exerted by the rotary member of the meter.

In order to permit the pivoted lever to return, under the action of gravity, to its normal position after the weight has been raised, the ring is operatively disconnected from the pulley by means of a helical surface which is arranged to engage with a pin projecting from the ring and causes said ring to rock on its horizontal pivot and thereby to release the pulley once in every half revolution of the meter. It is found in practice that, with this arrangement, the friction between the pin and the helical surface above mentioned is liable to vary, and the object of the present invention is to construct improved devices for causing the rotary member of the meter to be disengaged from the pulley at the desired time.

According to the invention, electromagnetic means are provided which are controlled by the movement of the pivoted weighted lever to disconnect the rotary member of the meter from the pulley as soon as the weight on the pivoted lever has reached a desired upper limit of travel.

In order that the invention may be clearly understood, it will now be described with reference to the accompanying drawings in which Fig. 1 is a front view of the device constructed in accordance with my invention;

Figures 1, 2, 3, 4:
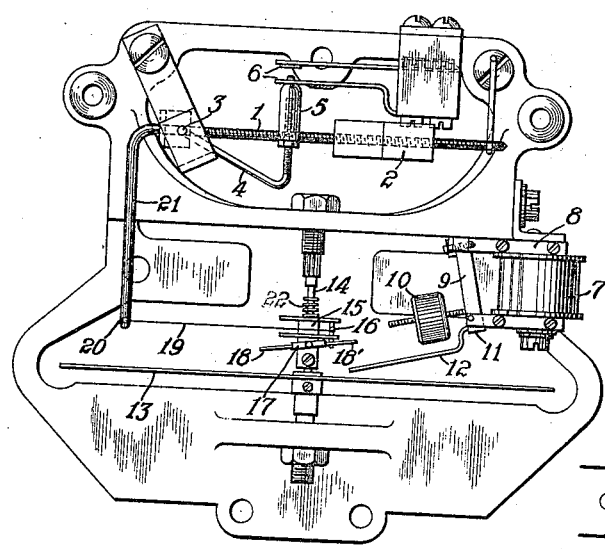
Fig. 2 is a diagram of connections for the device shown in Fig. 1.
Fig. 3 is a front view of a modified form of device embodying my invention.
Fig. 4 is a diagram of connections for the device shown in Fig. 3.

Referring to Fig. 1, a weighted bell-crank lever 1, having a weight member 2 and pivoted at a point 3, has an auxiliary arm 4 terminating in an internally threaded head-piece 5 which may be adjusted by means of the screw thread in such manner as not to disturb appreciably the balance of the weighted lever. Located immediately above the head-piece 5 is a pair of switch contact members 6, the terminals of which are connected in circuit with an electromagnet 7 that is mounted on a bracket 8. An armature 9, having a counterweight member 10, is pivoted to the electromagnet at a point 11, an extension 12 being fixed to the lower end of the armature 9. The armature member 13 of the meter is secured to the meter spindle 14 on which is loosely mounted a pulley 15 provided with a downwardly projecting pin 16. A ring 17 is mounted coaxially with the meter spindle 14, being attached by horizontal pivots thereto. Said ring is provided with radially projecting pins 18 and 18' that are adapted to engage the pin 16 projecting from the pulley 15 to rotate the pulley. The pulley 15 is connected by a cord 19 to the lower extremity 20 of a bell-crank lever arm 21.

As in the known construction hereinbefore referred to, a spring 22 is attached to the meter spindle 14 to exert a slight braking effect on the pulley 15 when this is rotated under the action of the bell-crank lever 1, as hereinafter described.

The electrical connections are shown in Fig. 2, the supply conductors being indicated at 23, the load at 24, the series coil of the meter at 25 and the shunt coil at 26. The coil 27 of the electromagnet 7 is connected across the line in series with the resistor 28, the switch contacts 6 and a choke coil 29. On the closing of the contacts 6, the coil 27 receives current from the line and becomes energized.

The operation of the device is as follows:—The weighted lever 1 is normally in the position shown in Fig. 1, and the tension in the cord 19 exerts a torque on the pulley 15 which is transmitted by the pin 16, through one or other of the pins 18 and 18' with which it is in engagement, to the ring 17 and thence to the meter spindle 14. When the meter is energized it tends to turn the meter spindle in a direction to oppose the torque above mentioned, and, before the spindle begins to turn, the torque exerted by the meter must be sufficient to overcome the retarding torque due to the action of the weighted lever 1. Until this condition arises, no movement of the meter occurs and no registration is made. When the power consumption exceeds the predetermined limit the meter torque becomes greater than the retarding torque and the spindle rotates under the differential action of the two torques, its speed being proportional to the difference between them and, consequently, to the amount by which the power taken by the customer exceeds the predetermined limit. As the meter rotates, the pin 16 and the pulley 15 are carried around by the horizontal pin with which it is in engagement, 18', for example, as shown in Fig. 1, thereby raising the weighted lever 1 through the action of the cord 19. At the completion of a half-turn of the pulley 15, the weighted lever 1 has reached the upper limit of its travel; the auxiliary arm 4 has also been carried up with it and the headpiece 5 engages with the lower switch contact member 6, causing it to move into engagement with the upper switch member 6. The electromagnet 7 is thereby energized to attract its armature 9, thus raising the extension 12. The horizontal pin 18, which is shown on the left in the drawing, has, by the rotation of the meter spindle, been moved to the right, consequently, the upward movement of the extension 12 raises this pin, thereby tilting the ring 17 and lowering the horizontal pin 18' to such an extent that it releases the pin 16. The torque exerted by the tension in the cord 19 will then rotate the pulley 15 backwards and permit the weighted lever to drop until the pin 16 meets the other horizontal pin 18 which is now in the position shown in the drawing as occupied by the pin 18', whereupon said pin 16 and pulley 15 will be carried around by said pin 18, and the cycle of operation will be repeated.

In Fig. 3, a modification of the device is illustrated in which the switch contact members 6 are normally closed, and the upward movement of the headpiece 5 is adapted to effect disengagement of the contact members. This is effected by a projection 30 on the upper switch contact member 6 which is engaged by the headpiece 5 and, when this is raised to its upper position, thereby opens the switch.

Fig. 4 shows the system of connections for the modified form of the device constructed in accordance with Fig. 3. The coil 27 is in series with the shunt coil 26 of the meter but is normally de-energized, as it is short-circuited by the contacts 6. When the weighted lever reaches its upper position, the headpiece 5 opens the contact 6, whereupon the coil 27 is energized and the operation takes place as before described. This arrangement possesses the advantage that the series resistance 28 and the choke coil 29 may be omitted.

Although two preferred forms of the invention have been described, it will be understood that various modifications in detail may also be introduced without departing from the spirit and scope of the invention, as set forth in the appended claims.

I claim as my invention:—

1. In an excess-demand meter, the combination with a rotatable member, a bell-crank lever, a pulley loosely mounted on the rotatable member, and means for connecting the lever to the pulley, of electrical means for controlling the connection of the pulley to the rotatable member.

2. In a motor meter, the combination with a rotatable member, a bell-crank lever, a pulley loosely mounted on the rotatable member, and a flexible means for connecting the lever to the pulley to move the lever, of means controlled by the movement of the bell-crank lever for so recurrently connecting the pulley to the rotatable member as to cause the lever to impose a substantially constant average retarding force on the rotatable member.

3. In a motor meter, the combination with a rotatable member, a bell-crank lever, a pulley loosely mounted on the rotatable member, and a flexible means for connecting the lever to the pulley, of means controlled by the movement of the bell-crank lever for recurrently resetting the pulley.

4. The combination with an electric meter of the motor type, a weighted bell-crank lever, and a pulley loosely mounted on the meter spindle and connected to one arm of the bell-crank lever, of means controlled by the bell-crank lever for controlling the connection of the pulley to the meter.

5. The combination with a motor meter, a bell-crank lever, a pulley loosely mounted on the rotatable member of the meter, means for connecting the lever to the pulley and means for connecting the pulley to the movable member of the meter, of means controlled by the bell-crank lever for recurrently disconnecting the pulley from the movable member of the meter.

6. The combination with a motor meter, a bell-crank lever, a pulley loosely mounted on the rotatable member of the meter, means for connecting the lever to the pulley and means for connecting the pulley to the movable member of the meter, of electrical means controlled by the bell-crank lever for recurrently disconnecting the pulley from the movable member of the meter.

7. The combination with a motor meter, a bell-crank lever, a pulley loosely mounted on the rotatable member of the meter, means for connecting the lever to the pulley and means for connecting the pulley to the movable member of the meter, of electrical means controlled by the bell-crank lever for recurrently permitting the resetting of the pulley.

8. The combination with a motor meter, a bell-crank lever, a pulley loosely mounted on the rotatable member of the meter, means for connecting the lever to the pulley and means for connecting the pulley to the movable member of the meter, of an electromagnet for disconnecting the pulley from the movable member of the meter, and a switch actuated by the bell-crank lever for controlling the circuit of the electromagnet.

In testimony whereof, I have hereunto subscribed my name this tenth day of September, 1920.

GEORGE A. CHEETHAM.